United States Patent
Ishida et al.

(10) Patent No.: US 8,622,408 B2
(45) Date of Patent: Jan. 7, 2014

(54) STEP UNIT

(75) Inventors: Toshihiko Ishida, Aichi-ken (JP);
Tsutomu Takeuchi, Gamagori (JP);
Shigeyuki Miyazaki, Suzuka (JP); Shin Sakai, Kariya (JP); Seiichi Suzuki, Miyoshi (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/510,124

(22) PCT Filed: Nov. 17, 2010

(86) PCT No.: PCT/JP2010/070505
§ 371 (c)(1),
(2), (4) Date: Jul. 3, 2012

(87) PCT Pub. No.: WO2011/062199
PCT Pub. Date: May 26, 2011

(65) Prior Publication Data
US 2012/0261894 A1    Oct. 18, 2012

(30) Foreign Application Priority Data

Nov. 20, 2009    (JP) .................................. 2009-265142

(51) Int. Cl.
*E05F 15/14*    (2006.01)
(52) U.S. Cl.
USPC ........................................................ 280/163
(58) Field of Classification Search
USPC .................... 280/163, 164.1; 296/155; 49/360
See application file for complete search history.

(56) References Cited

U.S. PATENT DOCUMENTS

| 5,551,190 | A  | * | 9/1996  | Yamagishi et al. | 49/360 |
| 6,321,489 | B1 | * | 11/2001 | Murofushi et al. | 49/360 |
| 6,513,821 | B1 | * | 2/2003  | Heil             | 280/169 |
| 7,032,349 | B2 | * | 4/2006  | Oberheide et al. | 49/360 |
| 7,159,930 | B2 | * | 1/2007  | Yokomori et al.  | 296/155 |
| 7,243,461 | B2 | * | 7/2007  | Rogers et al.    | 49/360 |

(Continued)

FOREIGN PATENT DOCUMENTS

| JP | 4-062285 A | 2/1992 |
| JP | 6-083886 U | 12/1994 |

(Continued)

OTHER PUBLICATIONS

International Search Report (PCT/ISA/210) issued on Feb. 15, 2011, by the Japanese Patent Office as the International Searching Authority for International Application No. PCT/JP2010/070505.

*Primary Examiner* — Katy M Ebner
(74) *Attorney, Agent, or Firm* — Buchanan Ingersoll & Rooney PC

(57) ABSTRACT

A step unit comprises: a step member which is provided on the vehicle body side so as to be adjacent to a slide door of the vehicle and has a flat plate section on which an occupant's foot is placed; and a drive device which is affixed to the step member and drives the slide door to open and close the slide door. The step member is molded using a resin material and has a accommodation portion which is provided with a bottom formed below the upper surface of the flat plate section. The drive device is affixed while at least a part thereof is accommodated within the accommodation portion.

7 Claims, 8 Drawing Sheets

(56) References Cited

U.S. PATENT DOCUMENTS

| | | | |
|---|---|---|---|
| 7,287,805 B2 * | 10/2007 | Yamada et al. | 296/155 |
| 7,347,025 B2 * | 3/2008 | Fukumoto et al. | 49/360 |
| 7,354,100 B2 * | 4/2008 | Yokomori et al. | 296/155 |
| 7,585,014 B2 * | 9/2009 | Nishimura et al. | 296/155 |
| 7,648,194 B2 * | 1/2010 | Hirasawa et al. | 296/203.03 |
| 7,866,732 B2 * | 1/2011 | Oxley | 296/155 |
| 7,958,672 B2 * | 6/2011 | Ishihara | 49/26 |

FOREIGN PATENT DOCUMENTS

| | | |
|---|---|---|
| JP | 8-312247 A | 11/1996 |
| JP | 10-266697 A | 10/1998 |
| JP | 2007-132141 A | 5/2007 |

* cited by examiner

STEP UNIT

FIELD OF THE INVENTION

The present invention relates to a step unit, which includes a step member adjacent to a vehicle sliding door, and a drive device for the vehicle sliding door.

BACKGROUND OF THE INVENTION

Conventionally, a step unit is provided on a vehicle main body at a position that is adjacent to a vehicle sliding door. One type of typical step unit includes a step member and a drive device (motor unit), which is fixed to the step member and operates to open and close a vehicle sliding door. For example, refer to Patent Document 1.

In such a step unit, the step member is typically formed through sheet-metal processing and has a flat plate portion, on which occupants put their feet. The drive device is mounted at a position of the flat plate portion where the drive device is least obstructive to occupants. For example, the drive device is mounted at a position on the flat plate portion that is at the rearmost end.

PRIOR ART DOCUMENT

Patent Document

Patent Document 1: Japanese Laid-Open Patent Publication No. 2007-132141

SUMMARY OF THE INVENTION

However, in the above described step unit, since the drive device is fixed onto the flat plate portion, on which an occupant put a foot, the drive device undesirably protrude upward from the upper surface of the flat plate portion by a significant amount. This, for example, hampers a low-floor design of the passenger compartment. The drive device may be fixed to the lower surface of the step member, or the side that faces the ground surface. However, there is a limitation to the space below the step member, and the configuration has other drawbacks. For example, the waterproof design for the drive device (and its control circuit) would be complicated.

Accordingly, it is an objective of the present invention to provide a step unit that easily reduces upward protrusion of a drive device by a great degree.

According to the present invention, a step unit that includes a step member and a drive device is provided. The step member is provided on a vehicle main body to be adjacent to a vehicle sliding door, and has a flat plate portion for allowing an occupant to put his/her foot thereon. The drive device is fixed to the step member, and is for operating the vehicle sliding door to open and close. The step member is molded of a resin material and has an accommodation portion, which has a bottom that is formed at a position lower than an upper surface of the flat plate portion. The drive device is fixed such that at least a part thereof is accommodated in the accommodation portion.

This configuration reduces upward protrusion of the drive device from the upper surface of the flat plate portion. As a result, a low-floor design of the passenger compartment is possible. Further, unlike conventional step members, the step member is not formed through sheet-metal processing, but is molded of a plastic material. This allows the step member to have wide variety of shapes. Accordingly, it is possible to form the bottom of the accommodation portion at a position significantly lower than the upper surface of the flat plate portion. Therefore, it is possible to reduce upward protrusion of the drive device from the upper surface of the flat plate portion by a great degree.

A peripheral wall may be molded integrally with the step member to encompass the accommodation portion. The peripheral wall extends to a position upward of the upper surface of the flat plate portion.

This configuration restricts liquid from entering the accommodation portion, for example, from the upper surface of the flat plate portion. The drive device is therefore prevented from being wet. Particularly, it is difficult to form the peripheral wall about the accommodation portion through sheet-metal processing. However, since the step member is molded of a plastic material, the peripheral wall can be easily molded integrally with the step member.

A loop belt may be supported by a pulley provided on the lower surface of the step member and be arranged in an opening-closing direction of the vehicle sliding door. In this case, the drive device is used for rotating the belt. Also, a shaft support portion may be molded integrally with the step member, and the pulley may be detachably and rotationally supported by the shaft support portion.

This configuration eliminates the need for additional components such as a bracket for attaching the pulley and facilitates the attachment of the pulley. Particularly, it is difficult to form the shaft support portion, to which a pulley can be detachably attached and rotationally supported, through sheet-metal processing. However, since the step member is molded of a plastic material, the shaft support portion can be easily molded integrally with the step member.

The shaft support portion may be a non-annular shaft support portion, which has an opening on a side opposite to the direction of force that is perpendicular to the axis and applied to the pulley by the belt in a taut state. Further, the pulley may be attached to the non-annular shaft support portion by being inserted through the opening.

According to this configuration, the pulley is attached to the non-annular shaft support portion by being inserted through the opening. This allows the pulley to be easily installed and prevented from falling off by a force in a direction perpendicular to the axis applied by the belt in a taut state.

A loop belt may be provided on the lower surface of the step member and arranged in an opening-closing direction of the vehicle sliding door, and the drive device may be used for rotating the belt. Further, a regulation portion for regulating the position of the belt may be molded integrally with the lower surface of the step member to extend from the lower surface, and a metal sheet member may be fixed to a surface of the regulation portion on which the belt slides.

This configuration easily reduces wear of the regulation portion, which is molded of a plastic material. Also, wear of the belt can be reduced. Further, it is possible to reduce the generation of noise during operation.

The metal sheet member may be press fitted to the step member.

This configuration eliminates the necessity for fasteners such as screws for fixing. Particularly, it is difficult to form the metal sheet receiving portion, to which the metal sheet member is press fitted, through sheet-metal processing. However, since the step member is molded of a plastic material, the metal sheet receiving portion can be easily molded integrally with the step member.

The metal sheet member may have a folded back portion for preventing the belt from falling off downward.

This configuration prevents the belt from falling off downward without increasing the number of components.

DETAILED DESCRIPTION OF THE PREFERRED EMBODIMENTS

One embodiment according to the present invention will now be described with reference to FIGS. 1 to 9.

Figure 1:
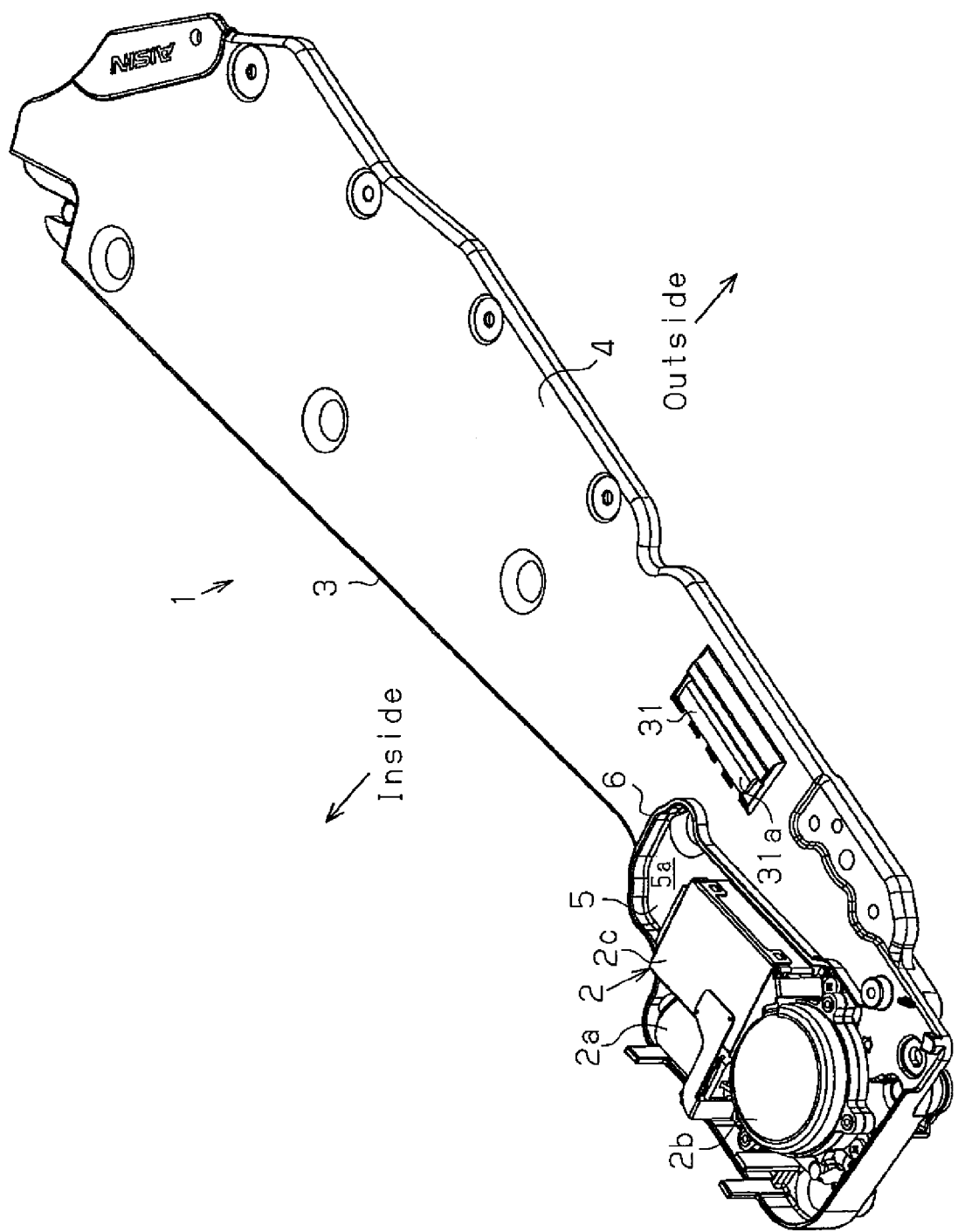
FIG. 1 is a perspective view from above illustrating a step unit according to one embodiment.
Figure 2:
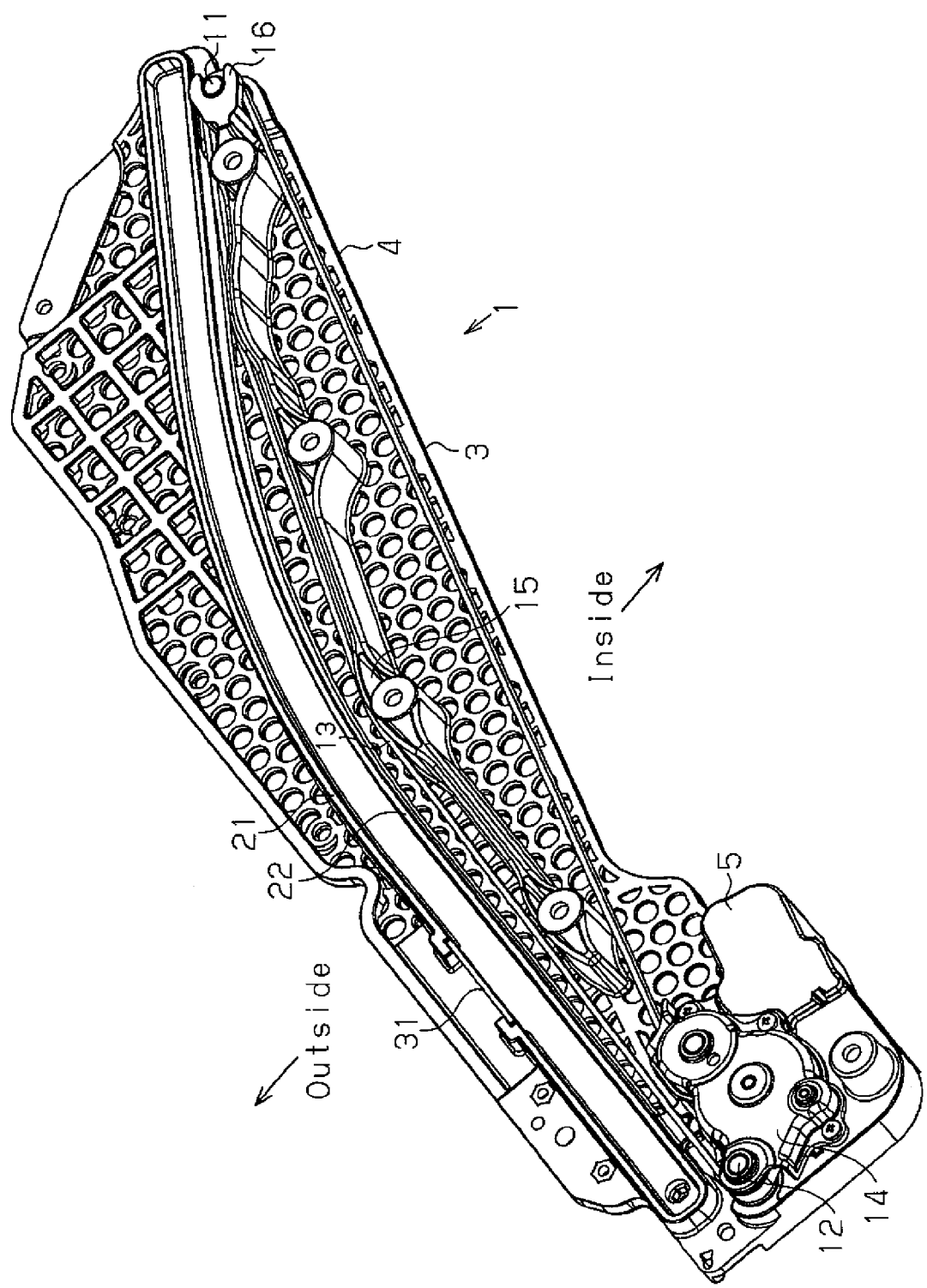
FIG. 2 is a perspective view from below illustrating the step unit according to the embodiment.

A vehicle has a step unit 1 shown in FIG. 1, which is located adjacent to a vehicle sliding door (not shown). In FIGS. 1 and 2, "outside" refers to the outside of the passenger compartment in the direction of the vehicle width, and "inside" refers to the direction toward the center of the passenger compartment in the direction of the vehicle width.

The step unit 1 is a type that includes a drive device (motor unit) 2 for opening and closing the vehicle sliding door. The step unit 1 is mainly constituted of the drive device 2 and a substantially plate-like step member (step) 3. The step unit 1 is fixed to the main body (not shown) of the vehicle. The entire upper surface of the step unit 1 is covered with a scuff plate, which is a thin plate-like decorative member (not shown). The upper surface of the drive device 2 (the lower surface of the thin plate-like scuff plate) is covered with a rigid plate or a cover (not shown).

The step member 3 is molded of a plastic material. The step member 3 is located in the passenger compartment at a position adjacent to the vehicle sliding door in the closed state, and includes a flat plate portion 4, on which an occupant places a foot when getting in or out of the vehicle, and an accommodation portion 5 (see FIGS. 4A and 4B). The accommodation portion 5 is formed continuous to the flat plate portion 4 and is located on a side of the flat plate portion 4 in the opening direction of the sliding door, or rearward of the flat plate portion 4. The step member 3 is fixed with a part of the drive device 2 accommodated in the accommodation portion 5.

Figure 3:
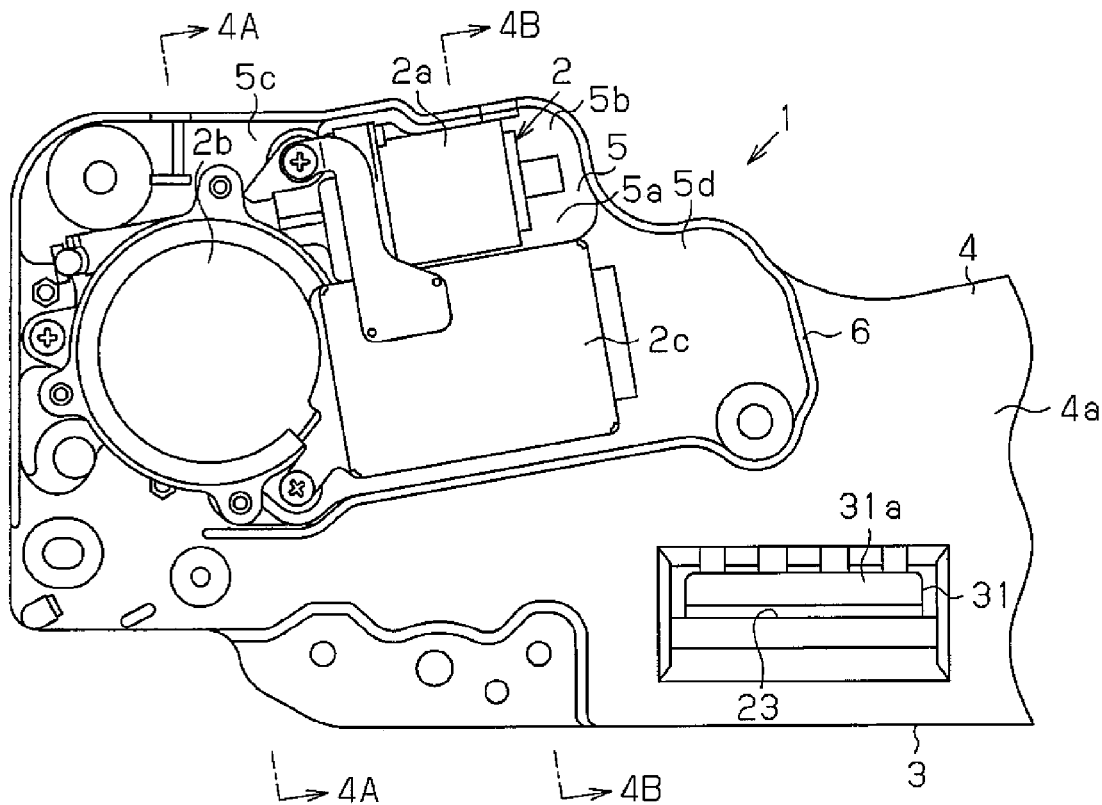
FIG. 3 is a partial plan view illustrating the step unit according to the embodiment.
Figure 4A:
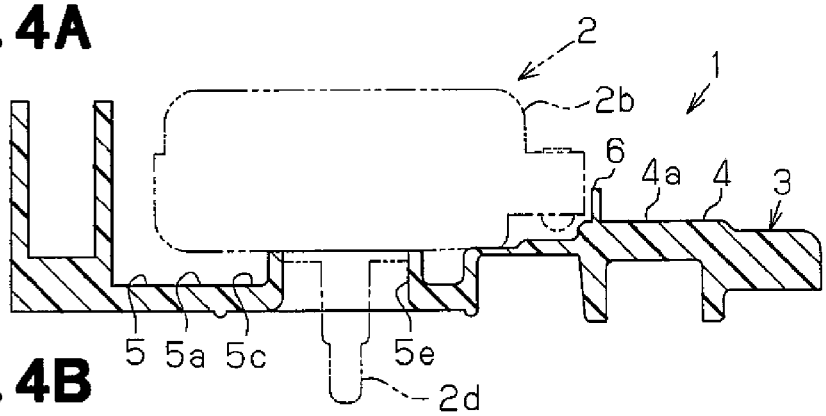
FIG. 4A is a cross-sectional view of the step member taken along line 4A-4A in FIG. 3.
Figure 4B:
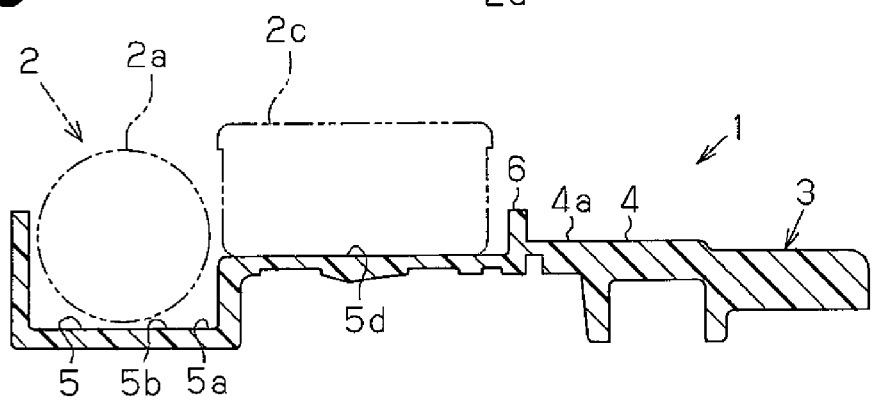
FIG. 4B is a cross-sectional view of the step member taken along line 4B-4B in FIG. 3.

Specifically, when the accommodation portion 5 is installed in the vehicle, a bottom 5a of the accommodation portion 5 is located at a lower position than an upper surface 4a of the flat plate portion 4 as shown in FIGS. 4A and 4B. The height (depth) of the bottom 5a of the accommodation portion 5 is determined based on the shape of the drive device 2. As shown in FIGS. 1 and 3, the drive device 2 includes a motor 2a, which is a drive source, an output portion 2b, which has a gear attached to the motor 2a and an electromagnetic clutch, a control circuit portion 2c, which is installed in the output portion 2b. The accommodation portion 5 includes a motor accommodating section 5b, an output portion accommodating section 5c, and a circuit accommodating section 5d as shown in FIGS. 4A and 4B. The drive device 2 is fixed by screws such that it partly contacts the bottom 5a of the accommodation portion 5, that is, a part of the drive device 2 is located lower than the upper surface 4a of the flat plate portion 4. One third or more of the entire thickness of the drive device 2 in the vertical direction is located below the upper surface 4a of the flat plate portion 4. In the present embodiment, substantially half the entire thickness is located below the upper surface 4a. In the present embodiment, a peripheral wall 6 is molded integrally with the step member 3 to encompass the accommodation portion 5. More specifically, the peripheral wall 6 substantially entirely surrounds the accommodation portion 5 as shown in FIGS. 1, 3, 4A and 4B. The peripheral wall 6 extends to a position above the upper surface 4a of the flat plate portion 4.

As shown in FIG. 2, pulleys 11, 12 are located on the lower surface of the step member 3. A loop belt 13 is supported by the pulleys 11, 12 and extends in the opening-closing direction of the vehicle sliding door. The drive device 2 rotates the belt 13. That is, as shown in FIG. 4A, an output shaft 2d of the output portion 2b of the drive device 2 extends through a through hole 5e formed in the bottom 5a of the accommodation portion 5 and protrudes from the lower surface of the step member 3. The output shaft 2d transmits power to the belt 13 via a power transmitting portion 14 (see FIG. 2), which is provided on the lower surface of the step member 3, thereby rotating the belt 13. In the present embodiment, the opening-closing direction of the vehicle sliding door corresponds to the front-rear direction of the vehicle. However, the path of the sliding door is curved inward toward the center of the passenger compartment at a front portion in accordance with the closed position of the vehicle sliding door. The position of the belt 13 is regulated by the pulleys 11, 12, which are located at ends in the vehicle front-rear direction, and a regulation portion 15, which is located between the pulleys 11 and 12 and extends from the lower surface of the step member 3. The regulation portion 15 is molded integrally with the lower surface of the step member 3.

Figure 5:
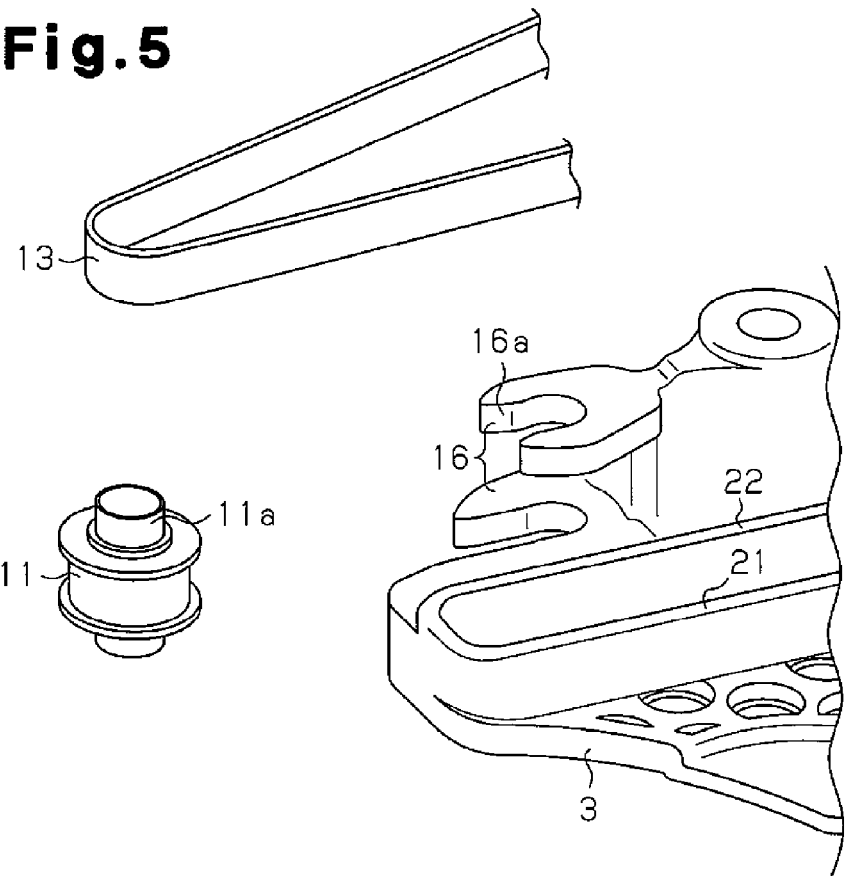
FIG. 5 is a partial exploded perspective view from below illustrating the step unit according to the embodiment.
Figure 6:
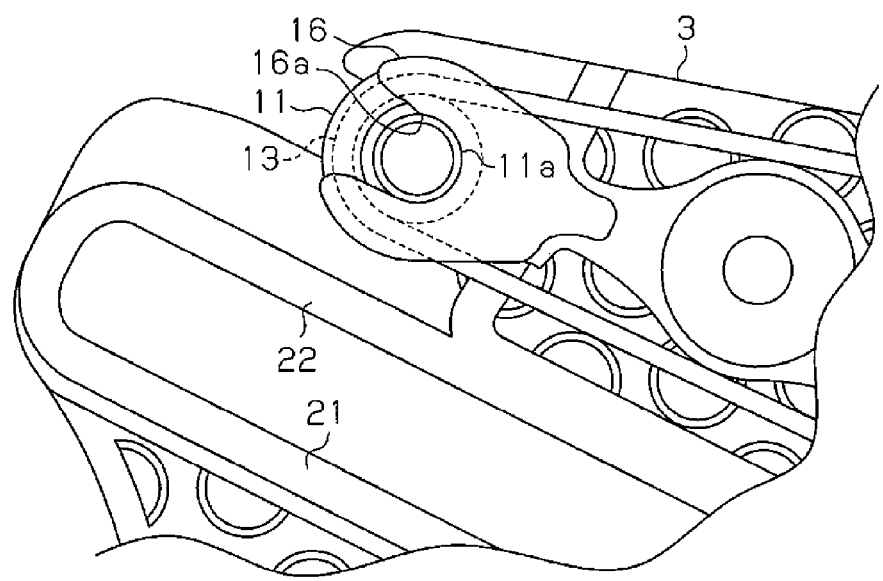
FIG. 6 is a partial bottom view illustrating the step unit according to the embodiment.

Non-annular shaft support portions 16, which serve as a shaft support portion, are molded integrally with the step member 3. The pulley 11, which is located at the front end, is rotationally supported by the non-annular shaft support portions 16 as shown in FIGS. 5 and 6. The non-annular shaft support portions 16 are formed to support the pulley 11 in a detachable and rotational manner. Specifically, the non-annular shaft support portions 16 are formed in a pair each having an opening 16a on the side opposite to the direction of the force that is perpendicular to the axis and applied to the pulley 11 by the belt 13 in a taut state. In other words, the openings 16a are located on the front side. The pulley 11 has a shaft 11a, which is fitted to the openings 16a, so that the pulley 11 is rotationally supported by the non-annular shaft support portions 16. The width of the openings 16a is slightly smaller than the diameter of the shaft 11a of the pulley 11 to form a holding structure, in which, regardless of the force applied by the belt 13, the pulley 11 does not come off when receiving a small force. The pulley 12, which is located at the rear end, is rotationally supported by the cover of the power transmitting portion 14 as shown in FIG. 2.

Figure 7:
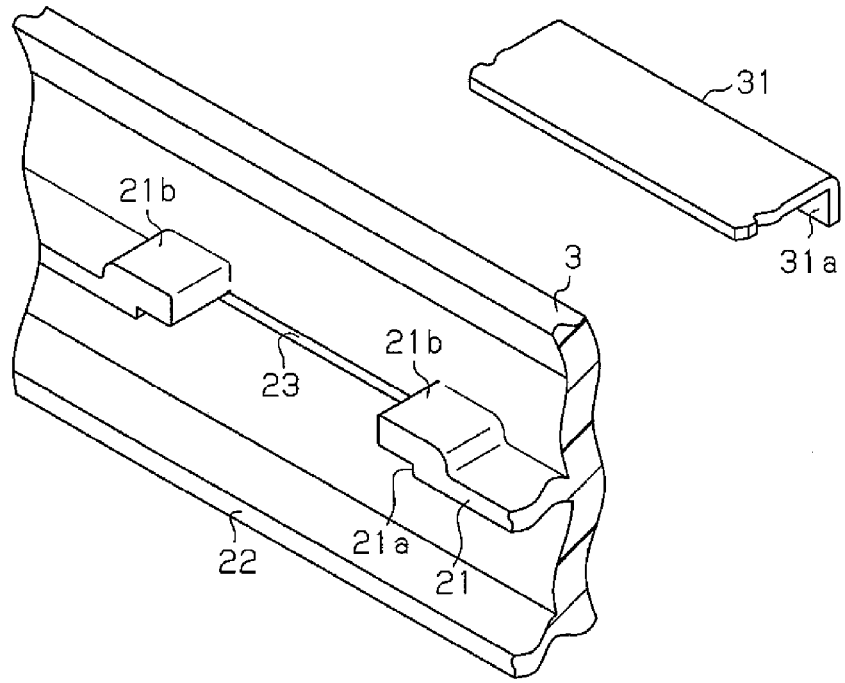
FIG. 7 is an explanatory exploded perspective view from below illustrating the support extensions and the rail plate member of the embodiment.
Figure 8:
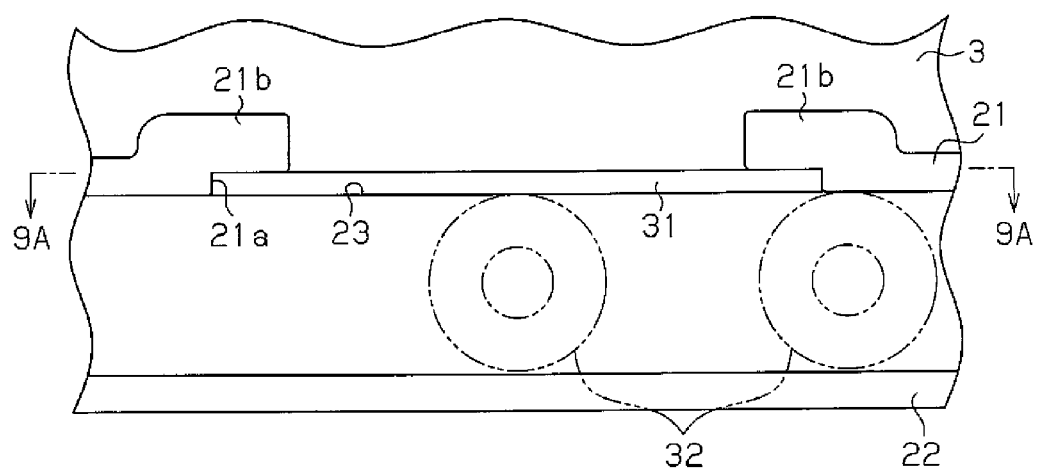
FIG. 8 is a partial bottom view illustrating the step unit according to the embodiment.

A pair of lower rails 21, 22 is molded integrally with the lower surface of the step member 3 as shown in FIG. 2. The lower rails 21, 22 extend in the opening-closing direction of the vehicle sliding door (substantially, the front-rear direction of the vehicle). The lower rails 21, 22 are connected to each other at both ends in the opening-closing direction (that is, substantially the front-rear direction of the vehicle). As shown in FIGS. 7 and 8, a cutout portion 21a is formed in a part of the lower rail 21. A rail plate member 31 is arranged at the cutout portion 21a to make the lower rail 21 continuous in the opening-closing direction of the vehicle sliding door. Rollers 32 (see FIG. 8) are provided between the lower rails 21, 22 (including the rail plate member 31). The rollers 32 are coupled to the vehicle sliding door, for example, via brackets (not shown). Thus, the rollers 32 and the vehicle sliding door are guided in the opening-closing direction by the lower rails 21, 22. The rollers 32 are coupled to the belt 13 via brackets (not shown), so that, as the belt 13 rotates, the rollers 32 are moved in the opening closing direction while being guided by the lower rails 21, 22.

Specifically, as shown in FIGS. 7 to 9A, the step member 3 has an insertion slit 23 extending in the vertical direction at a position that corresponds to the cutout portion 21a. Also, the step member 3 has support extensions 21b. The support extensions 21b extend from the ends of the cutout portion 21a of the lower rail 21 to support the rail plate member 31 against the load applied to the rail plate member 31 by the rollers 32 (see FIG. 8). As shown in FIG. 8, the pair of support extensions 21b extend from the ends of the cutout portion 21a of the lower rail 21 in the direction in which load is applied (upward as viewed in FIG. 8, and toward the outside with respect to the vehicle width direction), to approach each other without being connected to each other, so that there is a space therebetween. The support extensions 21b are thicker than the lower rail 21 in the direction in which the load is applied (the up-side direction as viewed in FIG. 8).

Figure 9A:
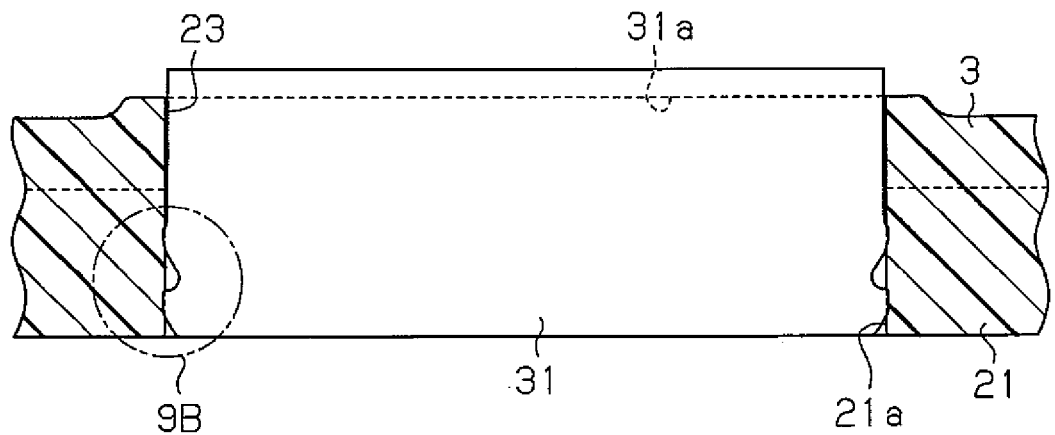
FIG. 9A is a cross-sectional view taken along line 9A-9A in FIG. 8.
Figure 9B:
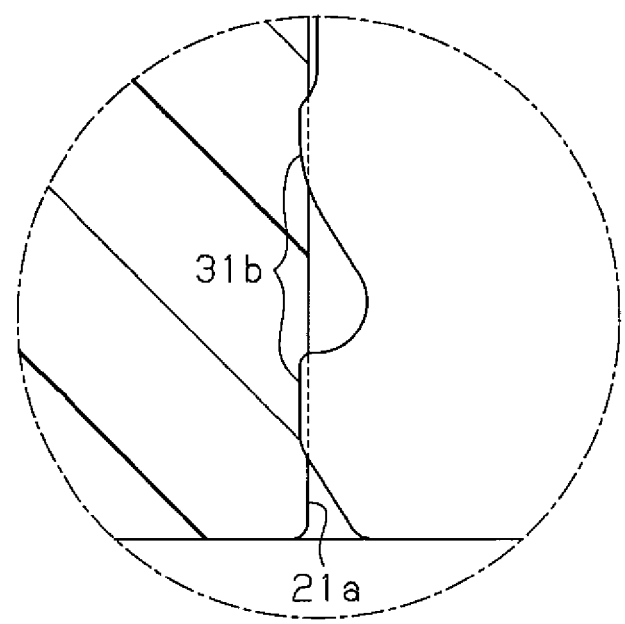
FIG. 9B is an enlarged view illustrating the part surrounded by the line formed by a long dash alternating with a short dash in FIG. 9A.

On the other hand, the rail plate member 31 is formed by processing a metal plate, and installed by being inserted through the insertion slit 23 from above the step member 3 as shown in FIG. 7. As shown in FIGS. 1 and 7, the rail plate member 31 has an angled portion 31a at the upper edge (the upper edge in a state after being installed). The angled portion 31a extends in a direction perpendicular to the vertical direction, or into the passenger compartment in the present embodiment. The rail plate member 31 is inserted into the insertion slit 23 such that the lower side of the angled portion 31a contacts the upper surface of the step member 3. In the present embodiment, the rail plate member 31 is fixed through press-fitting as shown in FIG. 9B. Specifically, the rail plate member 31 has a pair of press-fit portions 31b, which protrude from the sides of the rail plate member 31 that face the ends of the cutout portion 21a to be press fitted to the ends of the cutout portion 21a. When being inserted through the insertion slit 23 from above the step member 3, the rail plate member 31 is press fitted when the press-fit portions 31b are pressed against the ends of the cutout portion 21a of the lower rail 21. At this time, the sides of the cutout portion 21a of the lower rail 21 are shaven or elastically deformed by the press-fit portions 31b. However, as long as the rail plate member 31 can be press fitted, the structure may be changed.

In the above described configuration, the rail plate member 31 can be removed to insert rollers 32 into the space between the lower rails 21, 22 through the cutout portion 21a or remove the rollers 32 from the space between the lower rails 21, 22. When the drive device 2 is operated, the belt 13 is rotated. Accordingly, the rollers 32 are moved while being guided by the lower rails 21, 22, and the vehicle sliding door is operated to open or close. The output shaft 2d of the drive device 2 or the housing of the drive device 2 has an O-ring, which is not shown, so that water is completely or almost completely prevented from entering the interior of the drive device 2 or the bottom 5a of the accommodation portion 5 through the through hole 5e formed in the bottom 5a of the accommodation portion 5.

The present embodiment operates and has advantages as described below.

(1) The drive device 2 is fixed such that a part thereof is accommodated in the accommodation portion 5, which has the bottom 5a, and the bottom 5a is formed at a position lower than the upper surface 4a of the flat plate portion 4, on which an occupant put a foot. This structure reduces the amount of protrusion of the drive device 2 from the upper surface 4a of the flat plate portion 4. As a result, the low-floor design of the passenger compartment is possible. Further, unlike conventional step member, the step member 3 is not formed through sheet-metal processing, but molded of a plastic material. This allows the step member 3 to have wide variety of shapes. Accordingly, it is possible to form the bottom 5a of the accommodation portion 5 at a position significantly lower than the upper surface 4a of the flat plate portion 4. Therefore, it is possible to reduce upward protrusion of the drive device 2 from the upper surface 4a of the flat plate portion 4 by a great degree.

(2) The peripheral wall 6 is molded integrally with the step member 3 to encompass the accommodation portion 5 of the step member 3. The peripheral wall 6 extends to a position above the upper surface 4a of the flat plate portion 4. This reduces entry of liquid to the interior of the accommodation portion 5 from the upper surface 4a of the flat plate portion 4. The drive device 2 is therefore prevented from being wet. Particularly, it is difficult to form the peripheral wall 6 about the accommodation portion 5 through sheet-metal processing. However, since the step member 3 is molded of a plastic material, the peripheral wall 6 can be easily molded integrally with the step member 3.

(3) The step member 3 includes the integrally molded non-annular shaft support portions 16, which is a support shaft portion for detachably and rotationally support the pulley 11. This eliminates the necessity for additional components such as brackets. Also, the pulley 11 can be easily assembled with the non-annular shaft support portions 16. Particularly, it is difficult to form the shaft support portion, to which the pulley 11 can be detachably attached and rotationally supported, through sheet-metal processing.

However, since the step member 3 is molded of a plastic material, the shaft support portion can be easily molded integrally with the step member 3.

(4) The shaft support portion includes the non-annular shaft support portions 16, which have openings 16a on the side opposite to the direction of the force that is perpendicular to the axis and applied to the pulley 11 by the belt 13 in a taut state. The pulley 11 is inserted to the openings 16a to be attached to the non-annular shaft support portions 16. This allows the pulley 11 to be easily installed and prevented from falling off by a force in a direction perpendicular to the axis applied by the belt 13 in a taut state. It is difficult to form the pair of non-annular shaft support portions 16 described in the present embodiment through sheet-metal processing. However, since the step member 3 is molded of a plastic material, the non-annular shaft support portion 16 can be easily molded integrally with the step member 3.

The above-described embodiment may be modified as follows.

In the above illustrated embodiment, the regulation portion 15 is molded integrally on the lower surface of the step member 3 to regulate the position of the belt 13, and the position of the belt 13 is regulated only by the regulation portion 15. However, as shown in FIGS. 10 to 12, a metal sheet member 42 may be fixed to a surface of a regulation portion 41 on which the belt 13 sides.

Specifically, the regulation portion 41 for regulating the position of the belt 13 is molded integrally with the lower surface of the step member 3. The regulation portion 41 has a metal sheet receiving portion 41a at a position on which the belt 13 is likely to slide as shown in FIGS. 10 and 11. The metal sheet receiving portion 41a of this modification is configured to have an arcuate bulge 41b protruding toward the belt 13 as viewed from below (in the state installed in the vehicle, see FIG. 11) and locking grooves 41c, which are provided on the sides of the bulge 41b. On the other hand, as shown in FIG. 12, the metal sheet member 42 is formed to be curved and has an elastic piece 42a at in a lower portion (lower end when installed in the vehicle, the upper end as viewed in FIG. 12). The elastic piece 42a is formed by cutting and raising from the back of the metal sheet member 42 (concave side). The side edges of the metal sheet member 42 are fitted in the locking grooves 41c, and the elastic piece 42a is elastically deformed and pressed against the bulge 41b, so that the metal sheet member 42 is fixed to the regulation portion 41 of the step member 3. The elastic piece 42a is arranged at a position lower than the position of the belt 13, the vertical position of which is determined by the brims of the pulleys 11, 12 (refer to FIG. 10). Therefore, the belt 13 slides on the smooth front surface (bulging curved surface) of the metal sheet member 42, on which the elastic piece 42a is not formed.

Figure 10:
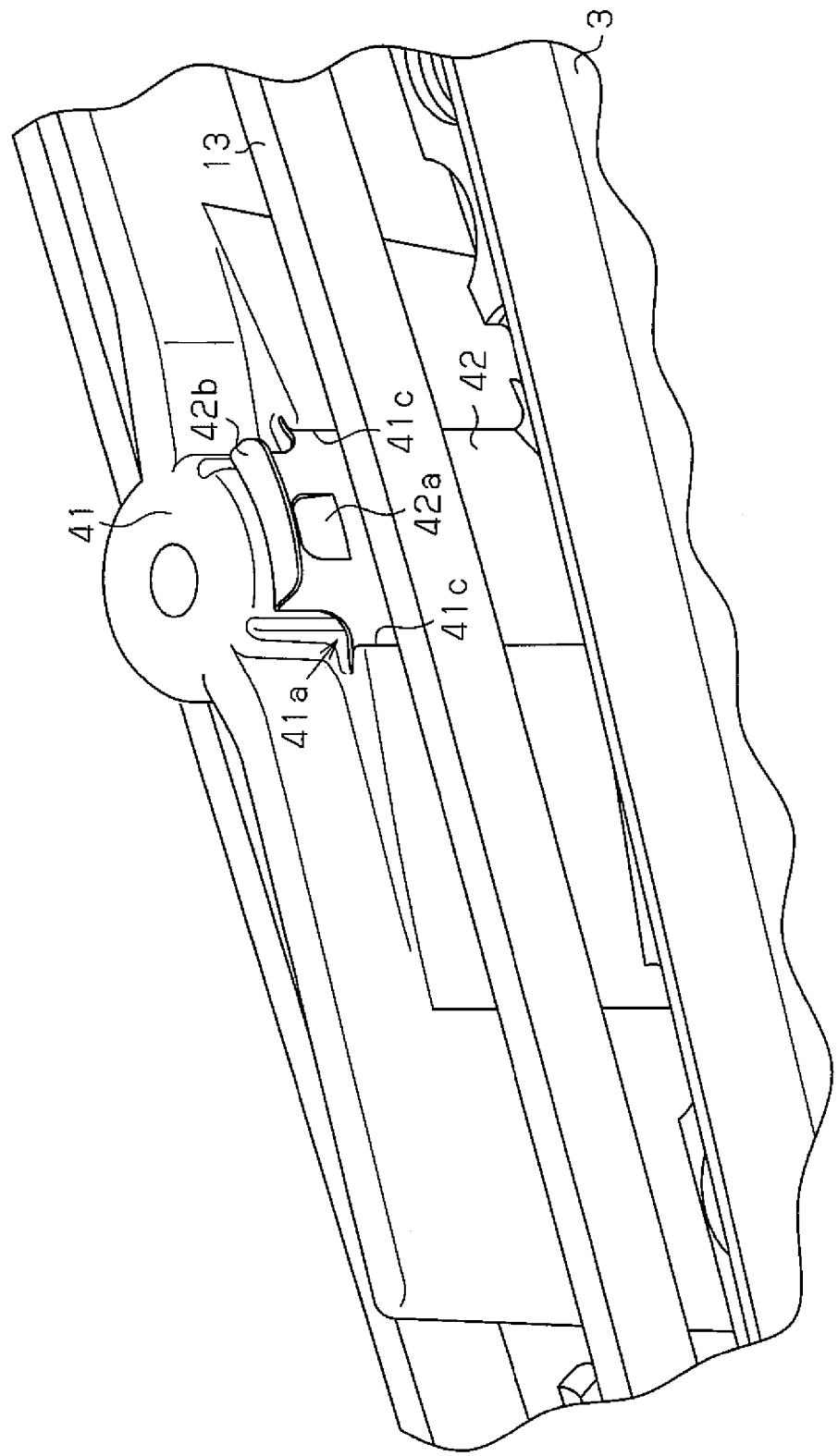
FIG. 10 is a partial perspective view from below illustrating the step unit according to a modification.
Figure 11:
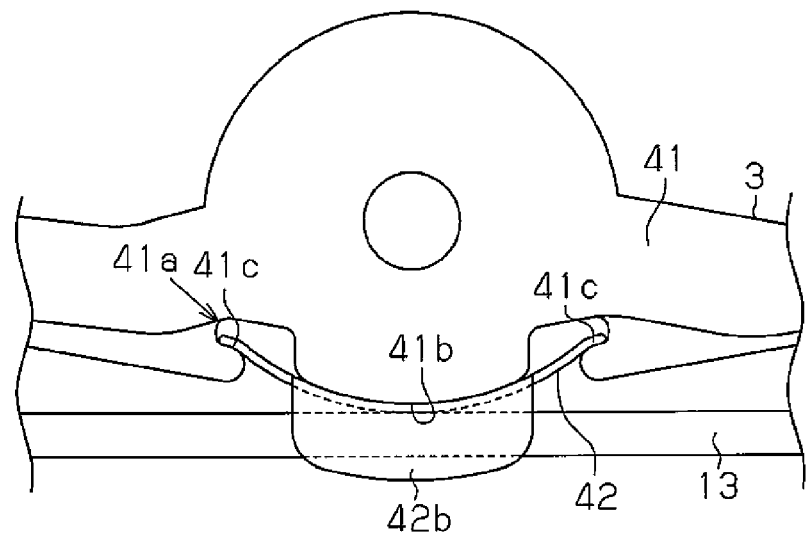
FIG. 11 is a partial bottom view showing a step unit the modification.
Figure 12:
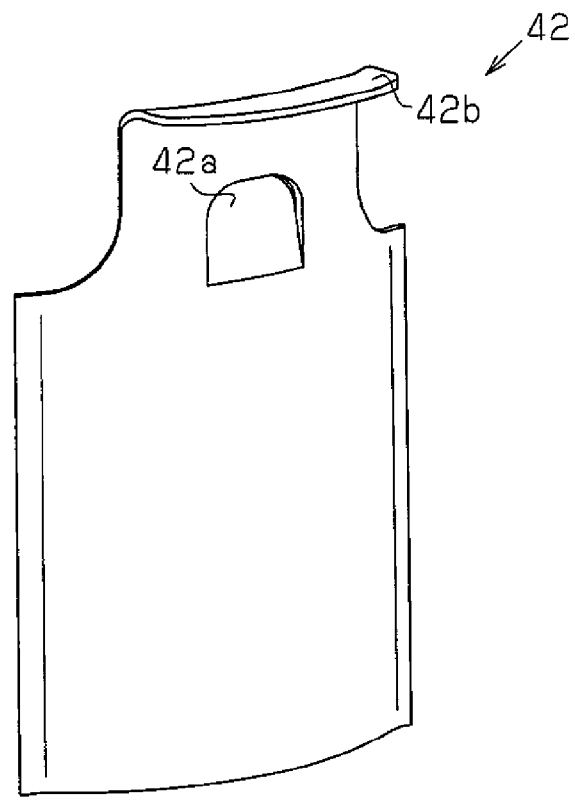
FIG. 12 is a perspective view showing a metal sheet member according to the modification.

The metal sheet member 42 of this modification has a folded back portion 42b at the lower end (lower end in a state installed in the vehicle, upper end as viewed in FIG. 12) as shown in FIGS. 10 to 12. The folded back portion 42b prevents the belt 13 from falling off downward.

Since the metal sheet member 42 is fixed to the surface of the regulation portion 41 that slides on the belt 13, wear of the regulation portion 41 molded of plastic material is easily suppressed. Also, wear of the belt 13 can be reduced. Further, it is possible to reduce the generation of noise during operation.

Since the metal sheet member 42 is press-fitted in the step member 3, no additional fasteners such as screws are needed. Particularly, it is difficult to form the metal sheet receiving portion 41a, to which the metal sheet member 42 is press fitted, through sheet-metal processing. However, since the step member 3 is molded of a plastic material, the metal sheet receiving portion 41a can be easily molded integrally with the step member 3.

Since the metal sheet member 42 has a folded back portion 42b for preventing the belt 13 from falling off downward, it is possible to prevent the belt 13 from falling off downward without increasing the number of components.

The metal sheet member 42 may be press fitted to the step member 3 using other structure. Also, the metal sheet member 42 may be fixed to the step member 3 using fastening members such as screws. The folded back portion 42b may be omitted.

The peripheral wall 6 may be omitted.

As a shaft support portion for rotationally supporting a shaft, the non-annular shaft support portions 16 may be replaced by other separate members such as brackets that rotationally support the pulley 11. The shaft support portion may have any configuration other than that of the non-annular shaft support portions 16, which have the openings 16a, as long as the shaft support portion is molded integrally with the step member 3 and can detachably and rotationally support the pulley 11. That is, a shaft support portion may be employed that does not have a function for preventing the pulley 11 from being caused to fall off by a force that is perpendicular to the direction of the axis and applied by the belt 13 in a taut state.

The step member 3 does not need to have the accommodation portion 5, in which the bottom 5a, which is at a position lower than the upper surface 4a of the flat plate portion 4. Even in this case, the advantages (3) and (4) can be achieved.

The invention claimed is:

1. A step unit comprising:
   a flat plate member provided on a vehicle main body to be adjacent to a vehicle sliding door and having an upper surface for allowing an occupant to put his/her foot thereon; and
   a drive device, which is fixed to the flat plate member, for operating the vehicle sliding door to open and close, wherein
   the flat plate member is molded of a resin material and has a recess, which has a bottom that is formed at a position lower than the upper surface of the flat plate member, and
   the drive device is fixed such that at least a part thereof is accommodated in the recess, wherein
   a peripheral wall is molded integrally with the flat plate member to encompass the recess, the peripheral wall extending to a position upward of the upper surface of the flat plate member.

2. The step unit according to claim 1, wherein
   a loop belt is supported by a pulley provided on a lower surface of the flat plate member and is arranged in an opening-closing direction of the vehicle sliding door, and the drive device is used for rotating the belt, and
   a shaft support portion is molded integrally with the flat plate member, the pulley being detachably and rotationally supported by the shaft support portion.

3. The step unit according to claim 2, wherein
   the shaft support portion is a non-annular shaft support portion, which has an opening on a side opposite to the direction of force that is perpendicular to the axis and applied to the pulley by the belt in a taut state, and
   the pulley is attached to the non-annular shaft support portion by being inserted through the opening.

4. The step unit according to claim 1, wherein
   a loop belt is provided on a lower surface of the flat plate member and arranged in an opening-closing direction of the vehicle sliding door, and the drive device is used for rotating the belt, and
   a regulation portion for regulating the position of the belt is molded integrally with the lower surface of the flat plate member to extend from the lower surface, and a metal sheet member is fixed to a surface of the regulation portion on which the belt slides.

5. The step unit according to claim 4, wherein the metal sheet member is press fitted to the flat plate member.

6. The step unit according to claim 4, wherein the metal sheet member has a folded back portion for preventing the belt from falling off downward.

7. A step unit comprising:
   a flat plate member provided on a vehicle main body to be adjacent to a vehicle sliding door and having an upper surface for allowing an occupant to put his/her foot thereon; and
   a drive device, which is fixed to the flat plate member, for operating the vehicle sliding door to open and close, wherein the flat plate member is molded of a resin material and has a recess, which has a bottom that is formed at a position lower than the upper surface of the flat plate member, and the drive device is fixed such that at least a part thereof is accommodated in the recess, wherein a loop belt is supported by a pulley provided on a lower surface of the flat plate member and is arranged in an opening-closing direction of the vehicle sliding door, and the drive device is used for rotating the belt, a shaft support portion is molded integrally with the flat plate member, the pulley being detachably and rotationally supported by the shaft support portion, the shaft support portion is a non-annular shaft support portion, which has an opening on a side opposite to the direction of force that is perpendicular to the axis and applied to the pulley by the belt in a taut state, and the pulley is attached to the non-annular shaft support portion by being inserted through the opening.

* * * * *